(12) United States Patent
Mueller et al.

(10) Patent No.: US 7,558,691 B2
(45) Date of Patent: Jul. 7, 2009

(54) METHOD FOR DETERMINING A CHARACTERISTIC OF A SENSOR ARRANGEMENT

(75) Inventors: Harald U. Mueller, Fulda (DE); Paul Szasz, Plankstadt (DE); Ralf Huck, Grosskrotzenburg (DE); Tilo Merlin, Linsengericht (DE); Steffen Keller, Constance (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 11/845,863

(22) Filed: Aug. 28, 2007

(65) Prior Publication Data

US 2008/0077345 A1    Mar. 27, 2008

(30) Foreign Application Priority Data

Aug. 29, 2006 (DE) ............... 10 2006 040 409

(51) Int. Cl.
*G01D 9/00* (2006.01)
*G06F 17/40* (2006.01)

(52) U.S. Cl. ............... 702/104; 702/85; 702/127; 73/1.01

(58) Field of Classification Search ............... 702/104, 702/85, 127
See application file for complete search history.

(56) References Cited

U.S. PATENT DOCUMENTS 5,781,141 A * 7/1998 Ikuta et al. ............... 341/154
7,124,045 B2 * 10/2006 Yamamoto et al. ......... 702/100
2002/0148217 A1 * 10/2002 Sawada ..................... 60/277
2007/0268952 A1 * 11/2007 Scott .......................... 374/1
2007/0268953 A1 * 11/2007 Price .......................... 374/1

FOREIGN PATENT DOCUMENTS

| DE | 44 34 318 (A1) | 3/1996 |
| DE | 102 42 128 (A1) | 3/2004 |
| DE | 103 30 251 (A1) | 1/2005 |
| DE | 10 2004 044 335 (A1) | 4/2006 |
| EP | 1 182 438 (B1) | 2/2002 |

* cited by examiner

*Primary Examiner*—Hal D Wachsman
(74) *Attorney, Agent, or Firm*—Buchanan Ingersoll & Rooney PC

(57) ABSTRACT

A method is disclosed for determining a characteristic of a sensor arrangement having at least one measuring sensor and at least one reference sensor for recording the same physical variable, and having an analysis unit electrically connected thereto. The characteristic is determined from measured values of the at least one measuring sensor and of the at least one reference sensor. It is proposed to record a characteristic point during continuous measurement operation, starting with the first time the sensor arrangement is put into operation, when a definable measurement point is reached in a process for the first time, if the changes in measured value in the variation over time of the at least one measuring sensor and in the variation over time of the at least one reference sensor remain within a definable tolerance band within a definable time interval.

15 Claims, 3 Drawing Sheets

METHOD FOR DETERMINING A CHARACTERISTIC OF A SENSOR ARRANGEMENT

RELATED APPLICATIONS

This application claims priority under 35 U.S.C. §119 to German Application 10 2006 040 409.2 filed in Germany on Aug. 29, 2006, the entire contents of which are hereby incorporated by reference in their entireties.

TECHNICAL FIELD

The disclosure relates to a method for determining a characteristic of a sensor arrangement having at least one measuring sensor and at least one reference sensor for recording the same physical variable, and having an analysis unit electrically connected thereto.

BACKGROUND INFORMATION

In many sectors of industrial process and instrumentation engineering, precise knowledge of a given physical variable is required for optimum process control. In this case, such a sensor arrangement is required to meet high standards such as robust construction, high resistance to vibration and thermal shock, insensitivity to chemically corrosive media and, if applicable, to radioactive radiation. These conditions must be satisfied cumulatively depending on the place of installation. Furthermore, the sensors should also exhibit high measurement accuracy and high reproducibility over long periods of time.

It is known that the characteristic of a measuring sensor changes as a result of events during use and aging. As the deviation from the known characteristic of the measuring sensor increases, its measurement accuracy falls. High measurement accuracy can hence only be guaranteed if the accuracy of the sensors is checked from time to time by calibration. The sensor has to be removed from the installation for this purpose.

EP 1182 438 B1 discloses a sensor arrangement comprising two different sensor types, in which a correction value for the measured value of the physical variable is calculated during an initialization phase, in which the temperature range of interest is traversed, from the difference in the detected measured values of the sensor of the first type and of the sensor of the second type, and is added so that the calculated resultant measured values for both sensors are practically equal. In the subsequent measurement and operation phase, both the respective resultant measured values and their deviations are monitored in order to detect aging-dependent drift phenomena, and an alarm is given if a limit is violated.

Owing to the individual sensors having a different response to the dynamic behavior of the process, during the initialization phase there may be a dynamic mis-calibration of the sensor arrangement resulting later in a false alarm.

In addition, there can be an accumulation of effects caused by different measurement principles, by the distance of each individual sensor from the source of the physical variable, hysteresis and manufacturing tolerances amongst identical types of sensors.

Furthermore, the initialization phase of the known method is linked to a semi-continuous temperature profile which regularly involves intervention in the process.

SUMMARY

The object of the invention is hence to define for the known sensor arrangement a method for determining a characteristic for drift detection, for which mis-calibrations caused by the dynamic behavior of the process are avoided.

The invention makes use of the fact that a sensor drift is a very slow-working process that is essentially caused by changes in the material in the sensing elements, and that a sensor is free of drift when it is first put into operation.

The invention is also based on a sensor arrangement having at least one measuring sensor and at least one reference sensor for recording the same physical variable, and having an analysis unit electrically connected thereto, with a characteristic of the sensor arrangement being recorded from measured values of the at least one measuring sensor and of the at least one reference sensor, and being retained for later drift detection.

According to the invention, the characteristic, starting with the first time the sensor arrangement is put into operation, is recorded during continuous measurement operation. Whenever a definable measurement point is reached in the process for the first time, a characteristic point is recorded if the changes in measured value of the at least one measuring sensor and of the at least one reference sensor remain within a definable tolerance band within a definable time interval.

In the context of this disclosure, it is intended that the change in measured value within a definable time interval includes any variation over time of the measured value within the time interval.

False initializations as a result of measurements by separate sensors of variations over time of a highly dynamic physical process variable are thereby advantageously avoided.

A dedicated initialization phase can be dispensed with as a result of recording the characteristic during continuous measurement operation. This means that interventions in the process according to the known method can be avoided.

In addition, in the case of temperature measurement, the invention manages with the means of the known temperature sensor arrangement. In fact, a reference sensor for the measuring sensor is sufficient to implement the invention.

According to another feature of the invention, the limit is adjusted dynamically to suit the changes in measured value as a function of the changes in measured value of the at least one measuring sensor and of the at least one reference sensor within the definable time interval. This provides a reliable means of avoiding recording incorrect characteristic points even for a process with highly dynamic behavior.

BRIEF DESCRIPTION OF THE DRAWINGS

Further details and advantages of the invention are explained in greater detail below in an exemplary embodiment relating to a temperature sensor arrangement. In the figures used for this explanation.

DETAILED DESCRIPTION

In the simplest case, the temperature sensor arrangement comprises a measuring sensor and a reference sensor and an analysis unit electrically connected thereto. The measuring sensor and the reference sensor can be of identical and different design here.

Figure 1:
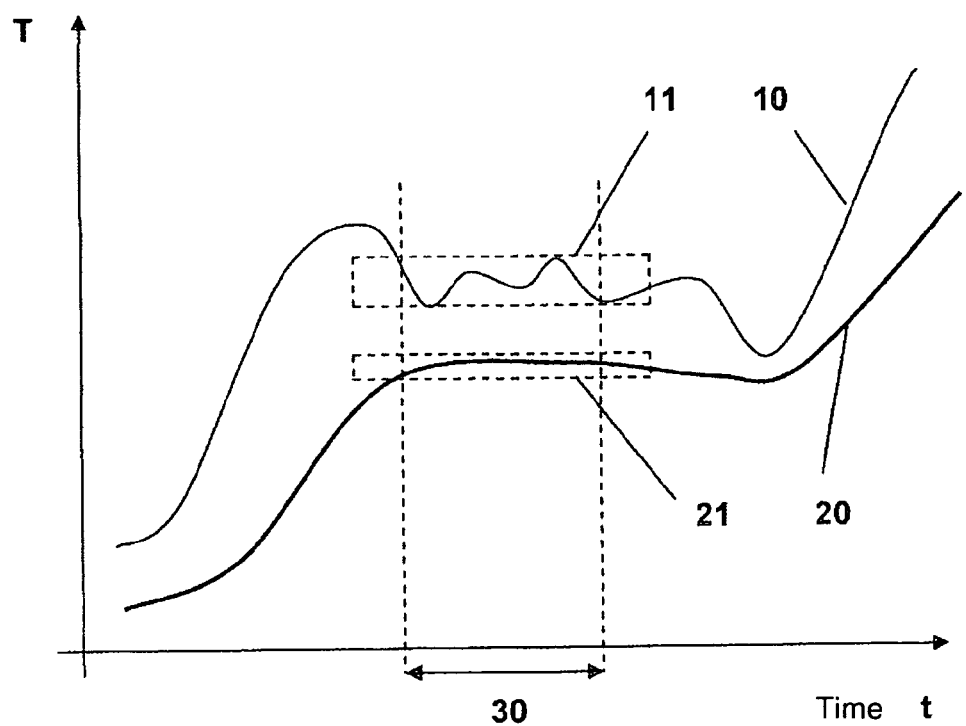
FIG. 1 shows a diagram of variations over time of measured signals.

Variations over time of measured signals are plotted in FIG. 1 as temperature values T over time t. The variation over time of the measured temperature value of the measuring sensor is denoted in the figure by the reference numeral 10, and the variation over time of the measured temperature value of the reference sensor is denoted in the figure by the reference numeral 20.

The measuring sensor and the reference sensor are preferably housed in a container sealed from the process, which protects the sensors from the process medium. In particular, a protective tube known per se can be provided for this purpose. An enclosure for accommodating the analysis unit is arranged at the opposite end of the protective tube from the process medium.

Figure 3:
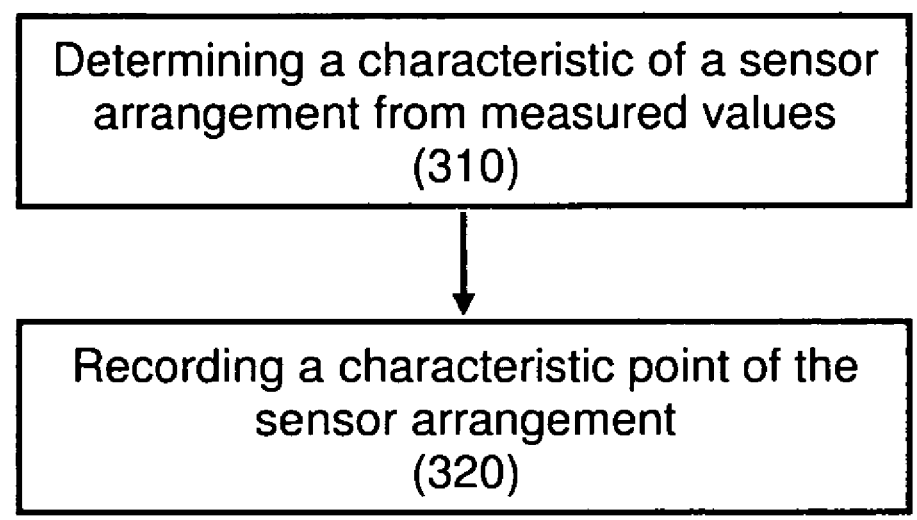
FIG. 3 shows an exemplary flowchart with abbreviated steps for determining a characteristic of a sensor arrangement.

As exemplified by step 310 of FIG. 3, the characteristic of the sensor arrangement is determined during continuous measurement operation, and starts with the first time the sensor arrangement is put into operation. When the sensor arrangement is put into operation, first a number of measurement points are measured based on a definable range and a definable resolution. From the measured physical process variable, the difference in the measured values of the at least one measuring sensor and of the at least one reference sensor is calculated as the characteristic value for each measurement point reached for the first time in the process, and is stored, assigned to the measurement point, if the changes in measured value of the at least one measuring sensor and of the at least one reference sensor remain within a definable tolerance band within a definable time interval 30.

For this purpose, the measured temperatures of the measuring sensor and of the reference sensor are recorded, and the temperature change within a definable time interval 30 is determined separately for each sensor.

As exemplified by step 320 of FIG. 3, a characteristic point of the sensor arrangement is only recorded when the changes in measured value of the measuring sensor and of the reference sensor remain within a definable tolerance band within a definable time interval.

The change in measured value from each sensor includes here any variation 10 and 20 over time of the measured value within the time interval 30. In the simplest case, the change in the measured value is the difference between the measured value at the end of the time interval and the measured value at the beginning of the time interval 30.

In a further exemplary embodiment of the invention, it can be provided to adjust the limit dynamically to suit the changes in measured value as a function of the changes in the measured value of the measuring sensor and of the reference sensor within the definable time interval. In particular, it can be provided to adjust the limit proportionally to the changes in measured value within the definable time interval 30. Thereby for a process with a highly dynamic behavior, and correspondingly large changes in measured value, in which the differences in the changes in measured value of the sensors, for example as a result of different positions because of structural constraints, also increase, the limit is dynamically increased, and in the quasi-stationary process it is dynamically reduced.

In a further exemplary embodiment of the invention, it can be provided to record a new characteristic value if the temperature changes of the measuring sensor and of the reference sensor lie below a definable limit for each separate sensor within a definable time interval 30 and the temperature sensor arrangement is in thermal equilibrium. The new characteristic value is the difference between the measured temperature value of the measuring sensor and the measured temperature value of the reference sensor.

In a further exemplary embodiment of the invention, it can be provided that the limit is adjusted dynamically as a function of the measured value of the physical variable. In the simplest exemplary embodiment of this feature, the limit is implemented as a fractional amount of the measured value of the physical variable. In this way, a higher absolute limit can be allowed for high measured temperature values than for low measured temperature values.

FIG. 1 shows variations 10 and 20 over time of the measured temperatures of the measuring sensor and of the reference sensor, with superimposed tolerance bands 11 and 21. Thermal equilibrium is assumed if, within a definable time interval 30, both the variation 10 over time of the measured temperature value of the measuring sensor remains within the tolerance band 11 and the variation 20 over time of the measured temperature value of the reference sensor remains within the tolerance band 21.

Where absolute changes in measured value within the definable time interval 30 are large, and differences between the changes in measured value of the measuring sensor and the changes in measured value of the reference sensor are small, it can be provided to use statistical methods to calculate the characteristic from a plurality of reference values. In an alternative exemplary embodiment, it can be provided to use analytical methods to calculate the characteristic from a plurality of reference values. Both exemplary embodiments have the common feature of recording initially a plurality of datapoints in the operating range of the sensor arrangement, to which a statistical or analytical method is applied in a subsequent sequence of steps.

Figure 2:
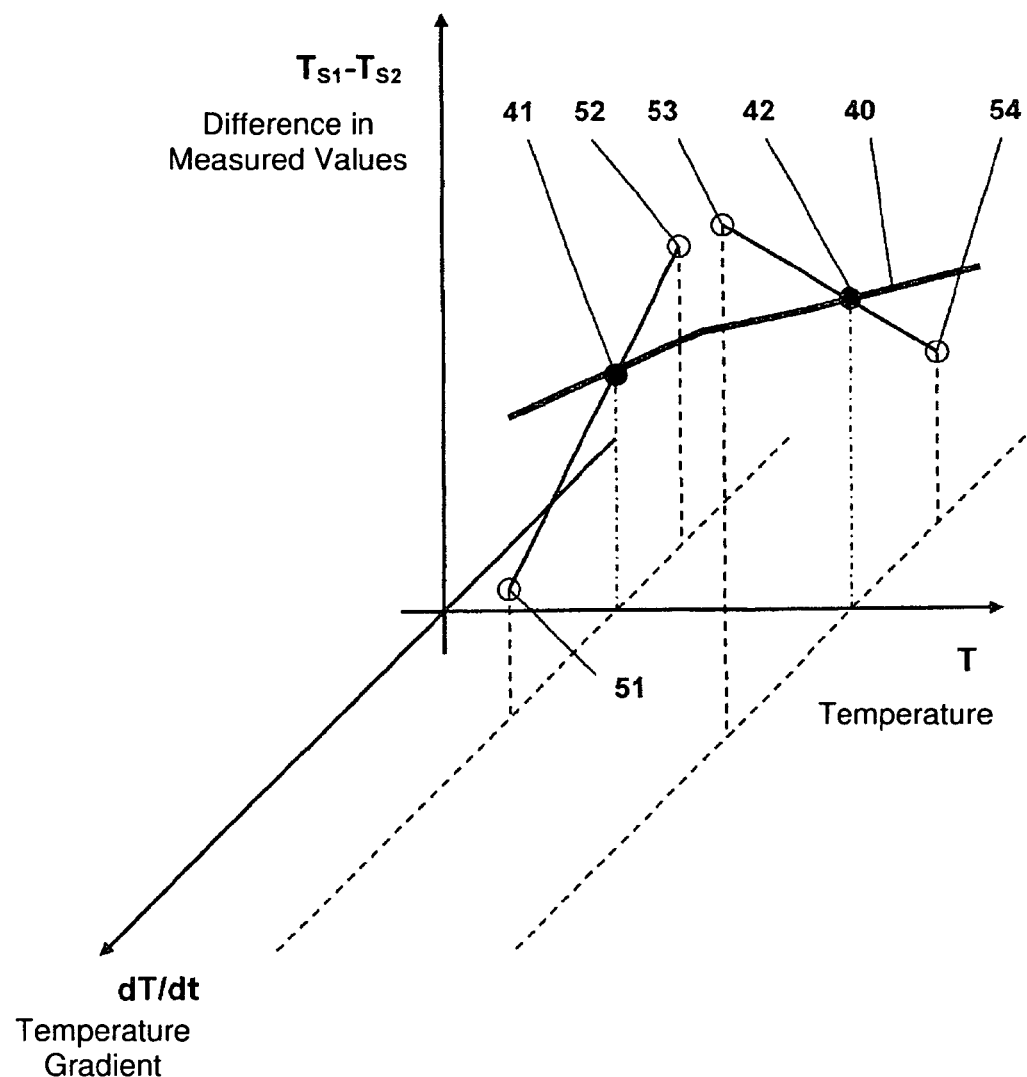
FIG. 2 shows a diagram for determining characteristic points.

In addition, FIG. 2 shows a diagram for illustrating the calculation of characteristic points from a plurality of measurement points. The characteristic 40 is plotted as the difference in the measured values of the measuring sensor $T_{S1}$ and of the reference sensor $T_{S2}$ over temperature T taking into account the temperature gradient dT/dt in the time interval considered.

A sensor arrangement comprising a measuring sensor and a reference sensor can be characterized dynamically by two first-order delay elements, known as PT1 elements. The deviation, as the difference in the measured values of the measuring sensor $T_{S1}$ and of the reference sensor $T_{S2}$, is given by the following equation:

$$T_{S1} - T_{S2} = \tau_{S2} * dT_{S2}/dt - \tau_{S1} * dT_{S1}/dt + f(T_{S1})$$

where $T_{S1}$, $T_{S2}$ are the measured values of the two sensors,
$\tau_{S1}$, $\tau_{S2}$ are their time constants, and
f is the static characteristic 40.

For steady-state linear temperature curves, the changes in measured value of the measuring sensor and the changes in measured value of the reference sensor are equal.

If the temperature difference values of the two sensors are available for two different changes in measured value at the same temperature $T=T_{S1}$, then the dynamic component can be determined from the equation above. The static component is stored as the point of the characteristic.

With reference to FIG. 2, a characteristic point 41 of the characteristic 40 can be derived from the measurement points 51 and 52 for the same temperature T and different temperature gradients dT/dt. In the same manner, another characteristic point 42 of the characteristic 40 can be derived from the measurement points 53 and 54 for another temperature T and different temperature gradients dT/dt.

For the sake of clarity, just two measurement points 51 and 52, plus 53 and 54 are shown respectively in FIG. 2 for each characteristic point 41 and 42. The invention includes using analytical or statistical methods known per se to derive characteristic points from a multiplicity of recorded measurement points.

In addition, missing characteristic points of the characteristic can be calculated to be provided by interpolation and/or extrapolation from measurement-based characteristic points.

In a further exemplary embodiment of the invention, it is provided that while the characteristic is still being determined, the deviation of the sensor arrangement from the recorded characteristic, i.e. its drift, is calculated for characteristic points that already exist. In this case, measuring the physical variable, recording the characteristic of the sensor arrangement and detecting drift take place simultaneously.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

CROSS-REFERENCE OF REFERENCE NUMERALS 10, 20 variation over time
11, 21 tolerance band
30 time interval
40 characteristic
41, 42 characteristic point
51 . . . 54 measurement point

What is claimed is:

1. A method for determining a characteristic of a sensor arrangement having at least one measuring sensor and at least one reference sensor for recording the same physical variable, and having an analysis unit electrically connected thereto, the method comprising:
   determining said characteristic from measured values of the at least one measuring sensor and of the at least one reference sensor; and
   recording a characteristic point during continuous measurement operation, starting with the first time the sensor arrangement is put into operation, when a definable measurement point is reached in a process for the first time, if changes in measured value of the at least one measuring sensor and of the at least one reference sensor remain within a definable tolerance band within a definable time interval.

2. The method as claimed in claim 1, comprising:
   dynamically adjusting a limit to suit the changes in measured value as a function of the changes in measured value of the at least one measuring sensor and of the at least one reference sensor within the definable time interval.

3. The method as claimed in claim 2,
   wherein the limit is adjusted proportionally to the changes in measured value within the definable time interval.

4. The method as claimed in claim 3,
   wherein where changes in measured value within the definable time interval are small, a characteristic point is calculated from the difference in the measured values of the at least one measuring sensor and of the at least one reference sensor and is assigned to an associated measurement point of the sensor arrangement.

5. The method as claimed in claim 3,
   wherein where absolute changes in measured value within the definable time interval are large, and differences between the changes in measured value of the at least one measuring sensor and the changes in measured value of the at least one reference sensor are small, a characteristic point is statistically calculated based on a plurality of reference values.

6. The method as claimed in claim 3,
   wherein where absolute changes in measured value within the definable time interval are large, and differences between the changes in measured value of the at least one measuring sensor and the changes in measured value of the at least one reference sensor are small, a characteristic point is analytically calculated based on a plurality of reference values.

7. The method as claimed in claim 1,
   wherein where changes in measured value within the definable time interval are small, a characteristic point is calculated from the difference in the measured values of the at least one measuring sensor and of the at least one reference sensor and is assigned to an associated measurement point of the sensor arrangement.

8. The method as claimed in claim 1,
   wherein where absolute changes in measured value within the definable time interval are large, and differences between the changes in measured value of the at least one measuring sensor and the changes in measured value of the at least one reference sensor are small, a characteristic point is statistically calculated based on a plurality of reference values.

9. The method as claimed in claim 1,
   wherein where absolute changes in measured value within the definable time interval are large, and differences between the changes in measured value of the at least one measuring sensor and the changes in measured value of the at least one reference sensor are small, a characteristic point is analytically calculated based on a plurality of reference values.

10. The method as claimed in claim 9,
    wherein missing characteristic points of the characteristic are calculated by interpolation and/or extrapolation from measurement-based characteristic points.

11. The method as claimed in claim 1,
    wherein missing characteristic points of the characteristic are calculated by interpolation and/or extrapolation from measurement-based characteristic points.

12. The method as claimed in claim 11,
    wherein while the characteristic is being determined, the deviation of the sensor arrangement from the recorded characteristic point is recorded for characteristic points that already exist.

13. The method as claimed in claim 1,
    wherein while the characteristic is being determined, the deviation of the sensor arrangement from the recorded characteristic point is recorded for characteristic points that already exist.

14. The method as claimed in claim 13, comprising
    dynamically adjusting a limit as a function of the measured value of the physical variable.

15. The method as claimed in claim 1, comprising
    dynamically adjusting a limit as a function of the measured value of the physical variable.

* * * * *